(12) United States Patent
Eswara et al.

(10) Patent No.: US 7,609,874 B2
(45) Date of Patent: Oct. 27, 2009

(54) SYSTEM AND METHOD FOR PREDICTION OF PITTING CORROSION GROWTH

(75) Inventors: Lalitha M. Eswara, Bangalore (IN); Lokesh R. Boregowda, Bangalore (IN); Thirumaran Ekambaram, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 705 days.

(21) Appl. No.: 11/314,903

(22) Filed: Dec. 21, 2005

(65) Prior Publication Data

US 2007/0140547 A1 Jun. 21, 2007

(51) Int. Cl.
*G06K 9/00* (2006.01)

(52) U.S. Cl. .......................... 382/149; 73/86; 382/152; 382/190; 382/218

(58) Field of Classification Search .................. 73/1.01, 73/86; 382/141, 149, 152, 190, 218
See application file for complete search history.

(56) References Cited

U.S. PATENT DOCUMENTS

| | | | |
|---|---|---|---|
| 4,412,174 A | 10/1983 | Conlon et al. | |
| 4,468,613 A | 8/1984 | Slough et al. | |
| 6,264,824 B1 | 7/2001 | Reid et al. | |
| 6,565,649 B2 * | 5/2003 | Mule'Stagno et al. | 117/13 |
| 6,766,055 B2 * | 7/2004 | Matsugu et al. | 382/173 |
| 6,933,718 B2 * | 8/2005 | Collingwood et al. | 324/242 |
| 7,190,177 B2 * | 3/2007 | Zoughi et al. | 324/642 |
| 2002/0078752 A1 | 6/2002 | Braunling | |
| 2003/0053697 A1 * | 3/2003 | Aylward et al. | 382/203 |
| 2006/0288756 A1 * | 12/2006 | De Meurechy | 73/1.01 |
| 2007/0098245 A1 * | 5/2007 | Mylaraswamy et al. | 382/141 |
| 2007/0140547 A1 * | 6/2007 | Eswara et al. | 382/141 |

OTHER PUBLICATIONS

"Examples of Pitting Corrosion Incidents", http://www.corrosion-doctors.org/Journal-2000/No3/No3-page4.htm, (2000),1-2.

Claridge, E., et al., "Evaluation of border irregularity in pigmented skin lesions against a consensus of expert clinicians", *Proceedings of Medical Image Understanding and Analysis*, (1998),85-88.

Hoeppner, D. W., et al., "Review of Pitting Corrosion Fatigue Models", *ICAF'99, Structural Integrity for the Next Millennium: Proceedings of the 20th Symposium of the International Committee on Aeronautical Fatigue*, (1999),1-25.

Kindlmann, G., et al., "Semi-automatic generation of transfer functions for direct volume rendering", *Proceedings of the 1998 IEEE symposium on Volume visualization*, (1998),79-86.

(Continued)

*Primary Examiner*—Gregory M Desire
(74) *Attorney, Agent, or Firm*—Schwegman, Lundberg & Woessner P.A.

(57) ABSTRACT

A system and method predicts pitting corrosion growth using imaging technology. In an embodiment, a first module preprocesses images to locate seed points, and a second module models a corrosion life cycle of the seed points. In another embodiment, the seed points are identified with defined confidence levels, and the rate of change of features in corrosion images is analyzed to identify dominant life-cycle phases of corrosion and defining corrosion impact factor for corrosion quantification.

19 Claims, 6 Drawing Sheets

OTHER PUBLICATIONS

Kreuz, M., et al., "Automated Diagnosis of Skin Cancer Using Digital Image Processing and Mixture-of-Experts", *Bildverarbeitung fur die Medizin—Algorithmen, Systeme, Anwendungen*, (2001),357-361.

Livens, S., et al., "A Texture Analysis Approach to Corrosion Image Classification", *Microsc. Microanal. Microstruct.*, 7(2), (1996),1-12.

Malik, P., et al., "Automatic assessment method for CT-MR image fusion based on a local confidence measure", *Tech Report*, (2003),1-8.

Metzler, V., et al., "Morphological multiscale shape analysis of light micrographs", *Proceedings of SPIE*, vol. 3961, (Mar. 2000),227-238.

Osada, R., "Shape Distributions", *ACM Transactions on Graphics*, 21(4), (2002),807-832.

Pohle, R., et al., "Segmentation of medical images using adaptive region growing", *Proc. SPIE*, vol. 4322, (Jul. 2001),1337-1346.

Qu, G., et al., "Medical image fusion by wavelet transform modulus maxima", *Optics Express*, 9(4), (Aug. 13, 2001),184-190.

Shi, P., et al., "Probabilistic corrosion fatigue life prediction", *8th ASCE Specialty Conference Probabilistic Mechanics and Structural Reliability*, (2000),1-6.

Straka, M., et al., "3D Watershed Transform Combined with a Probabilistic Atlas for Medical Image Segmentation", *Proceedings of MIT 2003*, (1-8),2003.

Zhao, Y. P., et al., "Characterization of pitting corrosion in aluminum films by light scattering", *Applied Physics Letters*, 73(17), (Oct. 26, 1998),2432-2434.

* cited by examiner

SYSTEM AND METHOD FOR PREDICTION OF PITTING CORROSION GROWTH

TECHNICAL FIELD

Various embodiments of the invention relate to the field of corrosion detection and prediction, and in particular, but not by way of limitation, the detection and prediction of corrosion through the use of image processing technologies.

BACKGROUND

Equipment and systems that are exposed to the elements often degrade over time due to the effects of corrosion. Corrosive effects are normally cumulative and assume phenomenal proportions over a period of time leading to equipment and system failures. Common equipment that is subject to corrosive effects include aircraft and water craft since they operate under conditions such as extreme temperature, extreme pressure, and high levels of moisture.

To study, gauge, and predict the effects of corrosion, advanced imaging technologies have been used to capture data that depict the corrosion. Some of these technologies include the Time-Of-Flight Diffraction (TOFD) technique, Electromagnetic Acoustic Transducers (EMAT), Ultrasonic technology, Eddy-Currents, and digital radiography imaging.

One type of corrosion common among equipment is pitting. FIG. 1 illustrates in diagrammatic form some of the many forms of pitting corrosion. The pitting corrosion illustrated in FIG. 1 includes subsurface pits, undercutting pits, vertical grain attack, horizontal grain attack, deep narrow pits, elliptical pits, shallow pits, and a mesa attack. Pitting corrosion may be very complex due to the process of corrosion growth and the type of pit formation as illustrated in FIG. 1. If left unchecked, such pitting will enlarge and eventually lead to failure of the equipment.

DETAILED DESCRIPTION

Figure 1B:
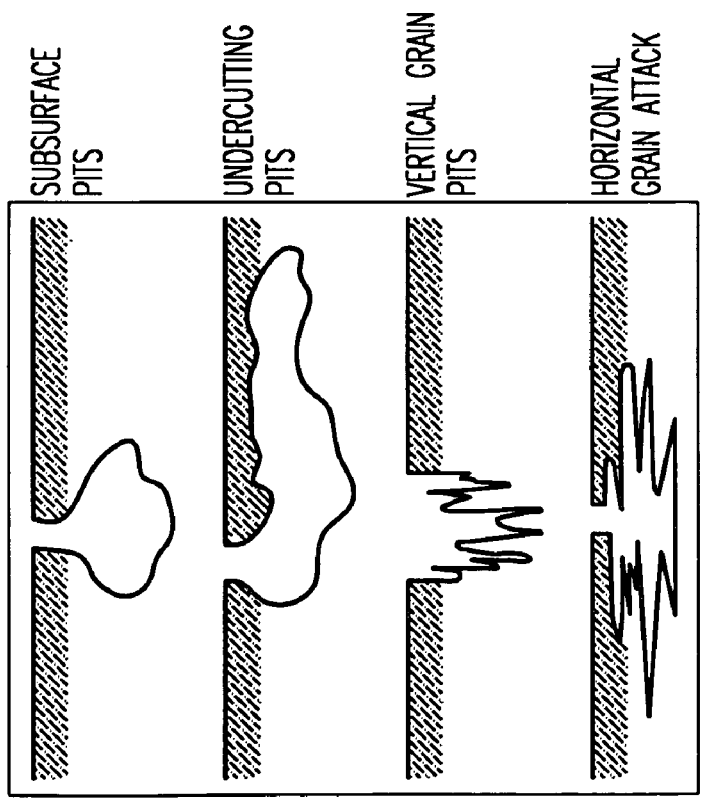
FIGS. 1A and 1B illustrates several examples of different types of pitting corrosion.
Figure 1A:
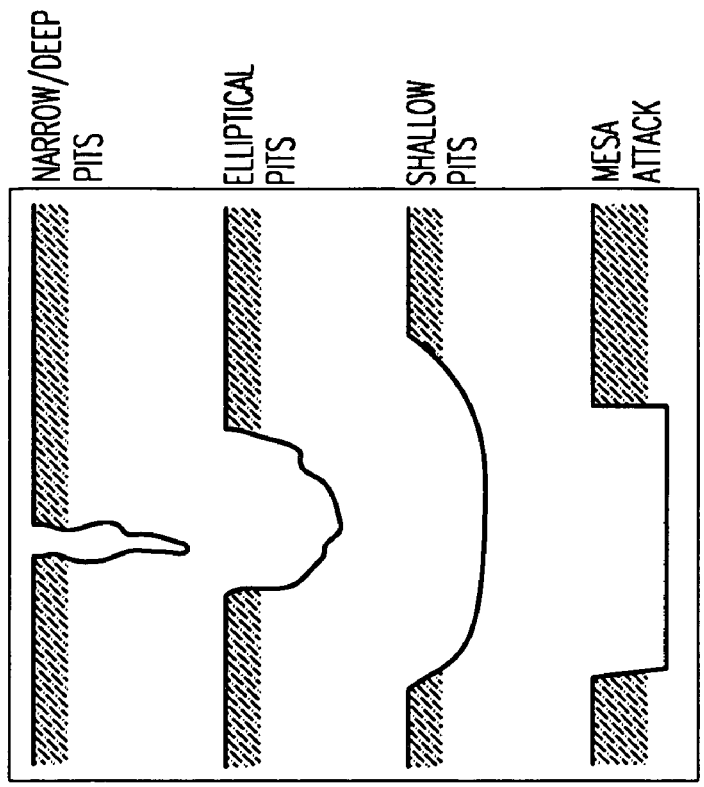

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

In an embodiment, a system and method predicts equipment and material fatigue by developing a corrosion model. Such a corrosion model assists in the decision making process to implement preventative measures to prevent system failures using image information. The images could be acquired by any image acquisition method, e.g., SAFT (Synthetic Aperture Focusing Technique). The current invention explains the method assuming that the input image information is in the form of SAFT images. Examples of such embodiments are illustrated in FIGS. 2, 3, 4 and 5.

In this embodiment, SAFT images are preprocessed and pitting seed points are identified with defined confidence levels (410). The neighborhood or area surrounding the pitting corrosion is then analyzed to derive specific features that can best explain the pitting corrosion (430). In this embodiment, a rate of change of features in corrosion images models the corrosion growth. Using this approach, certain high contrast points in the material that could be falsely identified as pits are eliminated since there will be no corrosion growth in such cases.

In another embodiment, two modules implement the corrosion detection and analysis. In a first module, SAFT images are preprocessed in order to locate seed points (410). In a second module, a corrosion life cycle of the identified seed points is modeled (470). By implementing this embodiment in two stages or modules, the successful identification of seed points facilitates the subsequent process of corrosion modeling.

Preprocessing of SAFT Images for Locating Seed Points

In an embodiment, the preprocessing of SAFT images addresses two issues. First, it addresses the presence of noise and edge effects caused by the SAFT imaging process. Second, the preprocessing addresses the presence of additional markers or authentic structural information in the image. This additional information could be due to structural unevenness caused by such things as rivets, joints, or markers put onto the imaging surface as a process step during imaging. The output images from the preprocessing step are then subjected to feature extraction for the identification of genuine seed points and corrosion growth.

Figure 2:
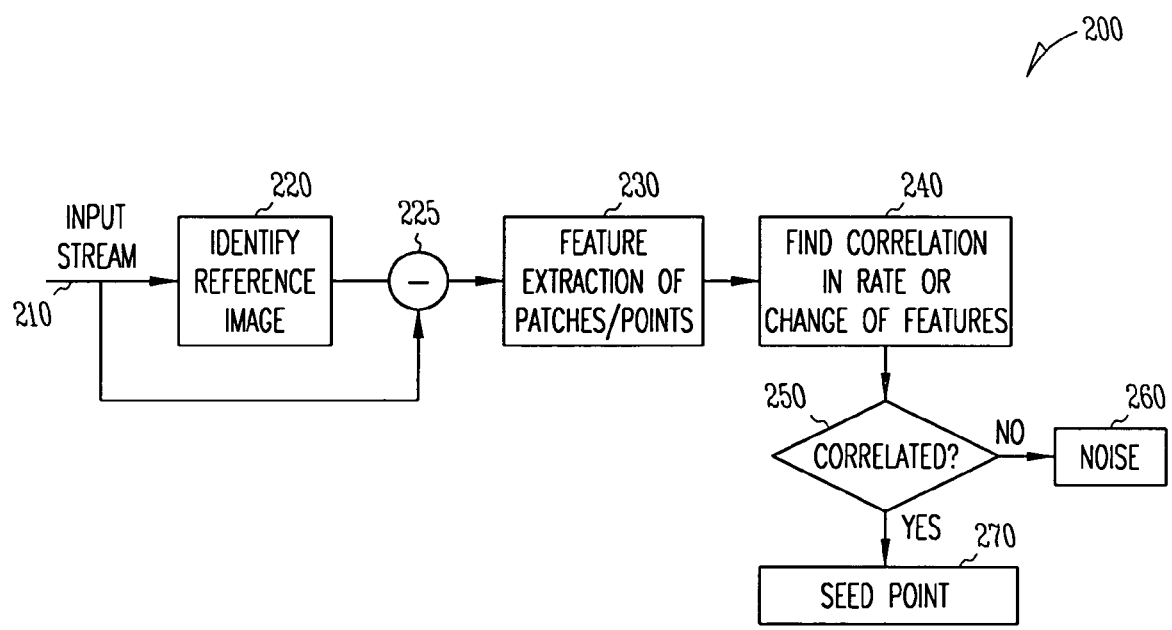
FIG. 2 illustrates a flow chart of an example embodiment of preprocessing for identification of corrosion seed points to be used as initialization for a corrosion analysis process.

FIG. 2 illustrates an embodiment of a preprocess 200 for SAFT images related to identifying and differentiating noise and seed points. In the preprocess of FIG. 2, a reference image 220 is identified in a input stream of data 210, and over a period of time successive images are subtracted from the reference image at 225. The physical features of potential patches and points are extracted from the reference image at 230. The preprocess 200 then calculates a correlation in the rate of change of the features at 240, and determines if they are correlated at 250. If there is no correlation, the features at issue are identified as noise at 260. If there is a correlation, the features at issue are identified as a seed point at 270.

The preprocessing 200 illustrated in FIG. 2 addresses the fact that SAFT images that are processed by different systems and subsystems in all likelihood add some amount of noise to the signal. This noise may interfere with a corrosion analysis. In several embodiments, this noise issue may be addressed by removing and/or reducing the noise in the images, or by quantifying and modeling the noise, and finally by removing the noise.

In an embodiment that removes the noise, a threshold can be applied to the image at issue. This threshold can either be data dependent (adaptive) or fixed in nature. Applying thresholds however may only be proper in cases where there is a clear distinction between the background and the signal. If this is not the case, there is the possibility of signal loss if the threshold is arrived at improperly.

In an embodiment that quantifies or models the noise, a reference image is used as input into the SAFT processing (440) to determine an expected output image (421). Then, an actual image is processed (422, 450), and the differences between the expected image and the actual image are quantified and modeled (460). However, the addition of noise due to processing apparatus is highly non-linear, thereby making it difficult to consistently identify and remove noise from a multitude of images.

To address the shortcomings of noise removal and noise modeling, a first image is captured (421). This first image is preferably taken early in the life of the equipment, and represents a non-corroded condition of the equipment. Thereafter, over a period of time, successive images are captured (422, 510), and these successive images are subtracted from the first image (520, 530). This subtraction could be straightforward, or it could be done on a weight adaptive basis. These steps reduce the noise components in the image information that are repetitive.

In the subtraction process, the first image is treated as a reference for the non-corroded structural or physical information of the region being analyzed. The successive images (the images of the same region captured in succession over a period of time extending from the time the first image was captured until the current instant), when differentiated with the first image, will result in the removal of common structural information represented in the images. Furthermore, as with the common structural information, any noise that is repetitively present in all the successive images and the first image is also removed. The differentiation between the first image and successive images may be made adaptive to derive higher levels of noise elimination. The adaptation can be achieved through the derivation of weights which in turn depend on the image statistics such as the image mean and standard deviation.

The images resulting from this subtraction are then processed with the assumption that any noise, patches, or points that were not filtered out via the subtraction are either corrosion-like noise or in fact are related in some way to actual corrosion points. Then, in an embodiment, the process extracts features (423, 430) from these images and analyzes the growth of these features over the successive images, i.e. over a period of time (424). Then, to determine if a patch or point is an actual pitting seed, a correlation or higher order statistical analysis is applied to the successive images to differentiate between corroded and non-corroded regions (540). To identify a seed point, the process looks for an expected direction of change in the patch or point and/or a correlation in the rate of change of features of the patch or point (426). If the data represent noise, the rate of change of the feature will not follow a pattern and/or will possess little or no correlation (425).

In an SAFT image, there is information that needs to be distinguished as either background or foreground information. The background and foreground can be distinguished by such data as contrast, gradient, neighborhood statistics, frequency, texture, and pattern information. Applying several of these data lead to the identification of seed points. The analysis of these data can be done using wavelet transforms, texture analysis, adaptive filtering, threshold setting, or image segmentation.

In an embodiment, one aspect of the SAFT image that is considered is the dimensions of the pit, including the pit shape and the pit size. In analyzing the pit shape, pit contour identification is done through deformable contours (also known as snakes). With deformable contours, an entropy based analysis using elastic models and boundary approximation helps obtain the bit fit contour and forms a basis for further analysis. For a convexity feature, the unevenness or irregular outward extensions of the contour are measured against the contours of the previous images. In a compactness feature, an object distribution and a boundary smoothness are measured. This may be particularly useful in estimating the start of a crack or sudden widening of a crack. For elongation and indentation, a rate of change of boundary irregularity and roughness is measured based on the variation in the compactness and shape of the feature. With a fractional dimension, the irregularity of the pit boundaries is measured. Regarding the pit size, the diameter of the pit mouth is measured. This analysis may use a region growing method for identifying the exact extent of the corrosion.

In another embodiment, the roughness of the potential pit is analyzed. Pits may be visualized as peaks and valleys over a surface. The roughness parameter may be calculated in one of two ways. An average roughness may be calculated by calculating the mean height over multiple images or scans over the surface. Mathematically, it is the arithmetic values of the height deviations within the evaluation length or area and measured from a mean line of the surface. The average roughness is useful for detecting general variations in the overall profile height of characteristics of the surface. However, the average roughness cannot detect differences in spacing or the presence or absence of infrequently occurring high peaks and deep valleys. These infrequently occurring high peaks and deep valleys will be averaged out and will result in only a small influence on the final roughness scale. Squaring each value over the evaluation length or area, followed by taking the square root of the mean gives the root mean square (RMS) roughness. Compared to the average roughness, the RMS roughness has the effect of giving an extra weight to the higher roughness values.

Since, in an embodiment, the roughness is measured as an irregularity over the surface of the equipment (the more the irregularity, the more corroded is the surface), fractal features are used in an embodiment to measure the roughness. In fractal features, specific regions in the surface image are identified, by evaluating the density of the pits in the regions. An image can be partitioned, and the density of the pits calculated for each region. Then, considering the entire image, areas where there is high corrosion (dense region of pits) can be identified from areas where there is low corrosion (sparse region of pits).

In another embodiment, crack length of the feature is used to identify corrosion. Cracks form in the surface usually after certain corrosion growth. Cracks may be identified in an image as irregular lines. Also, each crack line may be identified as a zigzag line, which might branch out into multiple cracks. Wavelet features and fractal dimension may be useful in quantifying the irregularity of the cracks (higher the irregularity, the higher is the crack severity). These phenomena become more irregular and more prominent over time, and this can be picked up in successive images over time. Therefore, crack length may be related to the degradation of the material. Furthermore, the rate of change of this parameter gives an indication of the time elapsed since its initiation in the material may be very useful in predicting the rate of fatigue and/or failure.

Corrosion Life Cycle Modeling

In an embodiment, a phase-based modeling approach is used to model the corrosion life cycle of a pit. In this embodiment, two aspects of the corroded surface/image are considered. A first consideration is the occurrence of many pits at different phases of the corrosion evolution. A second consideration is the local and global impact of the corrosion pits relating to the provision of timely (failure) warnings as appropriate. To account for these observations, the corrosion life cycle is modeled as three phases—a nucleation phase, a corrosion growth phase, and a crack propagation phase. In this particular embodiment, warnings are announced at an advance corrosion growth phase and in the crack propagation phase. In an embodiment, there are three types of output information from a corrosion analysis. First, three levels of warnings are indicated from the output. Second, a trend in the corrosion is presented by plotting a corrosion impact factor. Third, a three-dimensional visualization illustrates the predicted corrosion growth.

In an embodiment, feature dynamics, i.e. the rate of change of feature values, is used to evaluate the corrosion evolution in pits, thereby quantifying the contribution of each pit to the overall corrosion and potential of failure. In this embodiment, there are at least two methods that may be used to compute the impact of corrosion over a region. In a first method, a pit is weighted based on the phase, or dominant phase, that it is in, thereby giving more weight to corrosion pits and cracks, while at the same time, realizing that pits at the nucleation phase may lead to degradation. In a second method, in situations in which the number of pits and their contributions to overall corrosion remains the same, the density of pits in a sub-region should be determined (550). The reason for this being quite simply that a sub-region with a high density of pits may result in a higher fatigue than sub-regions with a lower density of pits. However, a failure could result from a single pit, and the second method takes this into account also.

Figure 3:
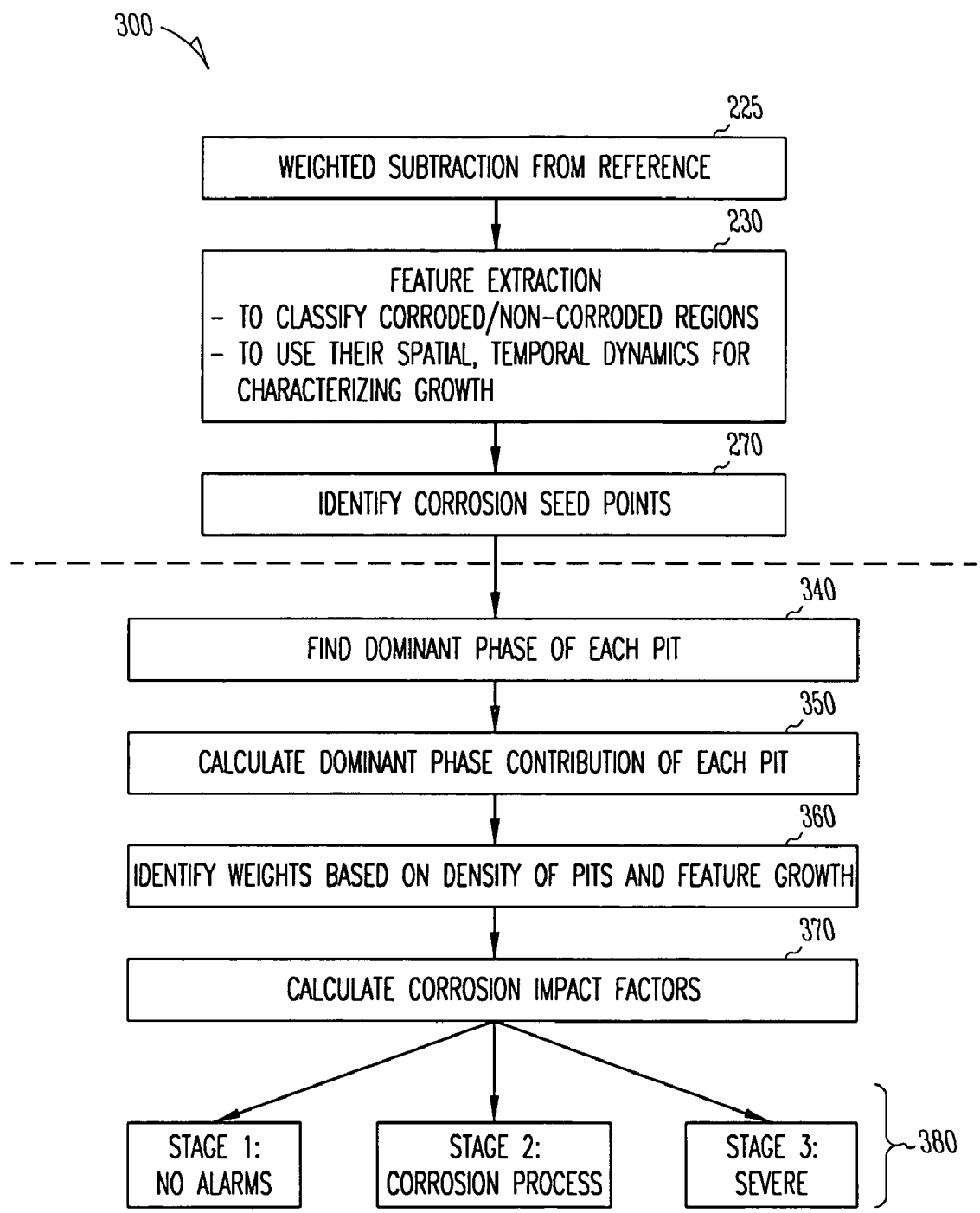
FIG. 3 illustrates a flow chart of an example embodiment of a method to model a corrosion life cycle.

FIG. 3 illustrates an example embodiment of a method 300 to model a corrosion life cycle of a structure, a material, or piece of equipment. FIG. 3 first illustrates once again the process for identifying corrosion seed points that includes subtracting images from the reference image and weighting such images at 225, the feature extraction of patches and points at 230, and identifying corrosion seed points at 270. After identifying the seed points at 270, the dominant phase in which a particular pit is determined at 340. As previously mentioned, the life cycle phases for a pit are corrosion nucleation phase, corrosion growth phase, and corrosion cracking phase. The rate of change that features are experiencing at any particular instant may be used to indicate temporal information in the form of corrosion growth factors. The derived features may then be used to infer the dominant life cycle phase of a pit. Additionally, examining features such as the correlation between pit depth, area, and shape can enhance the reliability of the estimation of the dominant phase.

In an embodiment, the determination of the dominant phase of a pit is as follows. First, if the rate of change of pit dimensions and the rate of change of crack formation is low, this may indicate that the pits are in a nucleation stage. Second, if the rate of change of pit dimensions is somewhat high, and the rate of change of crack formation is low, this may indicate that the corrosion growth phase is the dominant phase. Third, if the rate of change of pit dimensions is low, and the rate of change of crack formation is rather high, this could indicate that the pit is in the crack formation phase. Once the dominant phase of each pit is identified, the weighted sum of each individual pit is used to determine the severity index at a given point in the life of the equipment.

Figure 4:
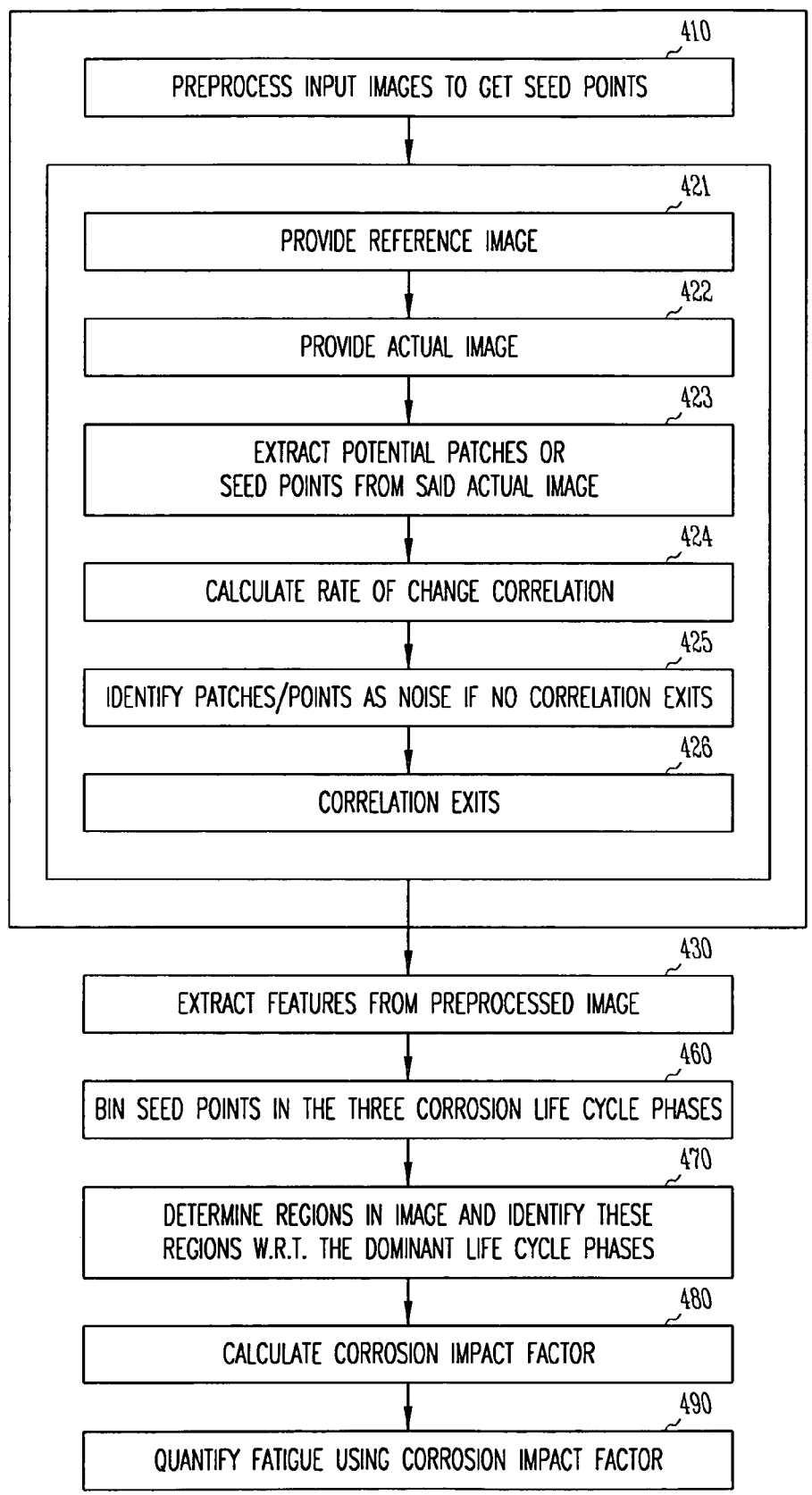
FIG. 4 illustrates a flow chart of an integrated example embodiment of the method to model a corrosion life cycle (combining stages in FIG. 2 and FIG. 3).
Figure 5:
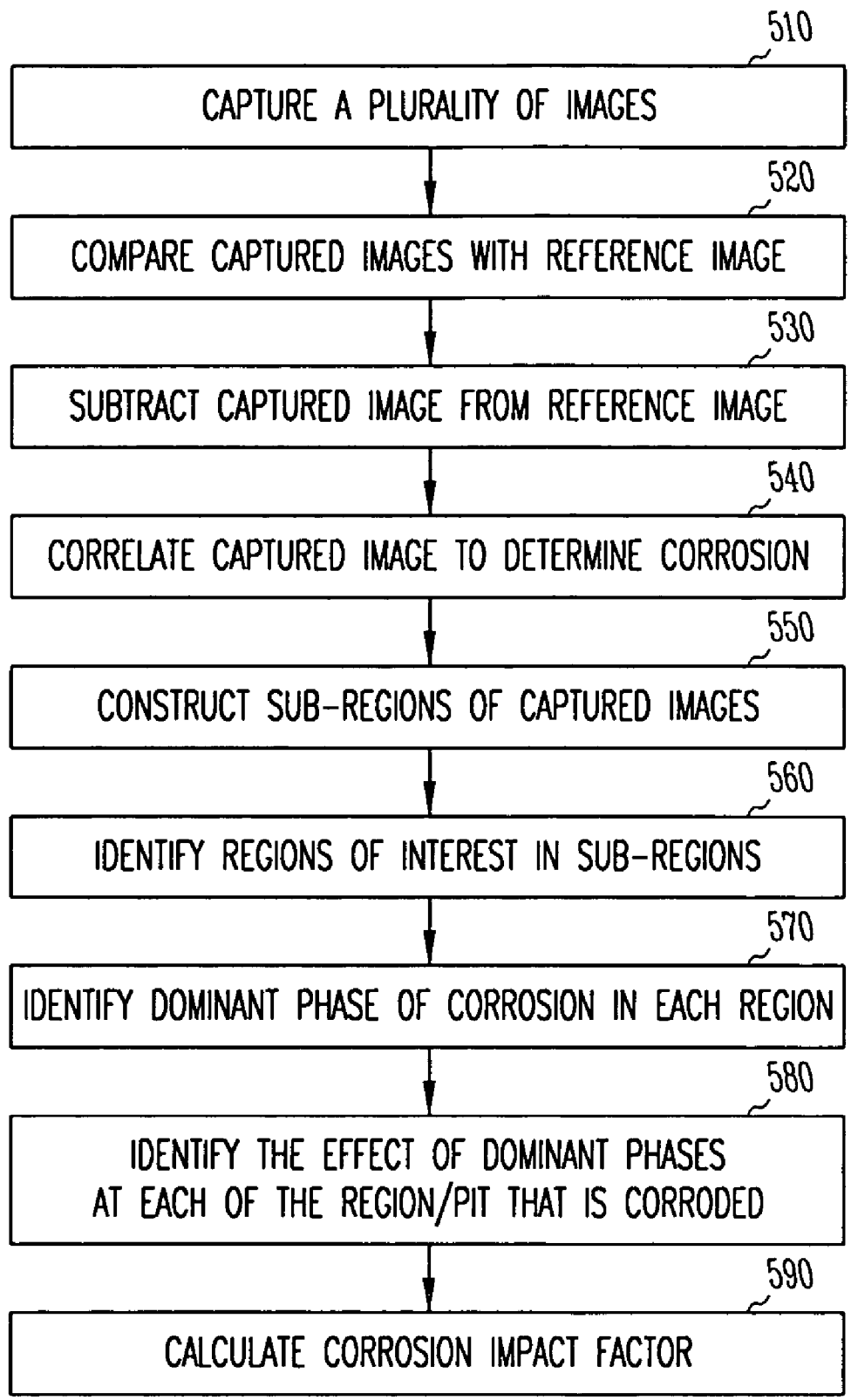
FIG. 5 illustrates a flow chart depicting a high-level approach to model a corrosion life cycle.

In an embodiment, the fatigue of a particular surface or piece of equipment is quantified. Fatigue, in general, is a combined effect of several pits in the region of interest (560). To quantify the fatigue, the dominant phase of each pit is considered (480, 570) and the contributions of each pit are combined to arrive at a Corrosion Impact Factor (CIF) (FIG. 3, 350, 360, 370; FIG. 4, 490; FIG. 5, 580, 590). CIF is also calculated by dividing the image into regions of pits and then finding the CIF for each region. In dividing the image into regions, factors such as the density of pits may be considered. In this embodiment, the CIF determines which warnings get published. As can be seen in FIG. 3 at 380, the stage of the corrosion, can be used as a basis to determine whether to publish a warning or not. In this embodiment, the CIF is calculated as follows:

$$CIF = \sum_{i=1}^{N1}(W_i * DPC_i) + \sum_{g=1}^{N2}(W_g * DPC_g) + \sum_{c=1}^{N3}(W_c * DPC_c) \quad \text{Equation No. 1}$$

Wherein in Equation No. 1,

The notation "i" indicates the nucleation phase;

The notation "g" indicates the growth phase;

The notation "c" indicates the crack phase;

The notation N1 represents the number of pits dominantly in the nucleation phase;

The notation N2 represents the number of pits dominantly in the growth phase;

The notation N3 represents the number of pits dominantly in the crack phase;

The notation $W_i$ is a weight derived from nucleation features and the dynamics and density of the pits;

The notation $W_g$ is a weight derived from growth features and the dynamics and density of the pits;

The notation $W_c$ is a weight derived from crack features and the dynamics and density of the pits;

The notation $DPC_i$ is the phase contribution of a pit whose dominant phase is the nucleation phase;

The notation $DPC_g$ is the phase contribution of a pit whose dominant phase is the growth phase; and The notation $DPC_c$ is the phase contribution of a pit whose dominant phase is the crack phase.

The values for $DPC_i$, $DPC_g$, and $DPC_c$ are calculated by considering the feature dynamics of the rate of change of the features.

The weights in the above CIF equation are calculated by considering the following aspects. If the density of pits in a sub-region is high, that region is given higher weight. If the distance between two pits is small, the weight given to these two pits is high because of the relatively high possibility that these two pits will eventually merge. If the pit dimensions and the phase of the pits in the sub-region is towards the growth and the crack phases, the weight of these regions/pits is higher. Finally, in the corrosion image sequence, if the rate of growth of the corrosion pits is greater in the subsequent phases of the life-cycles of the pits, these pits and hence these sub-regions are given higher weight.

The calculation of the DPC values is calculated as follows. The dominant phase is calculated based on the dynamics of features. If the rate of change of pit dimensions and crack information is small, it may indicate that the pits are in nucleation stage. If the rate of change of pit dimensions is greater and crack information is small, it may indicate corrosion growth phase as the dominant phase. If the rate of change of pit dimensions is small and the rate of change of crack information is larger, it may indicate crack formation phase.

In an embodiment, the corrosion is modeled in order to predict the corrosion. Specifically, the rate of change of the corrosion growth features is calculated. These features can be a sub-set of the above-identified features or they can be derivatives of the above-identified features. Once the features are obtained, the change or the rate of change will be considered for modeling, and the prediction is based on this modeling. This modeling considers the growth factors of the features and models the corrosion growth rather than the features. From this, the rate at which fatigue takes place can be predicted. Then, the CIF values may be modeled to predict the rate at which fatigue may take place.

An embodiment has associated therewith the following alarms as illustrated in FIG. 3 at 380 regarding the corrosion. In a stage 1, there are no alarms. In a stage 2, corrosion is progressing and depends primarily on the growth rate, and an alarm may or may not be sounded depending on the progress of the corrosion. In a stage 3, the severity is based on the extent of pitting and crack formation due to corrosion, and an alarm is normally sounded.

In an embodiment, a three dimensional (3D) rendered corrosion image from the two dimensional (2D) series of corrosion images indicates the corrosion growth visually. Specifically, the 3D image will show how the morphology of the pit evolves. For this embodiment, the greater the number of images within a specific time frame, the better will be the 3D rendered image. In situations where the elapsed time between two images is very large, the 3D rendered image can be an approximate view rather than a detailed one.

A challenge in this 3D visualization is mapping each pixel to the correct opacity and color values for meaningful viewing. This mapping requires appropriate automatic transfer functions. In cases in which the boundaries of the corrosion image are not so distinguishable, and there exists multiple boundaries for overlapping SAFT pixel intensity values (which is usually the case as is found in medical imaging), a higher dimensional transfer function for such visualization should be developed.

Figure 6:
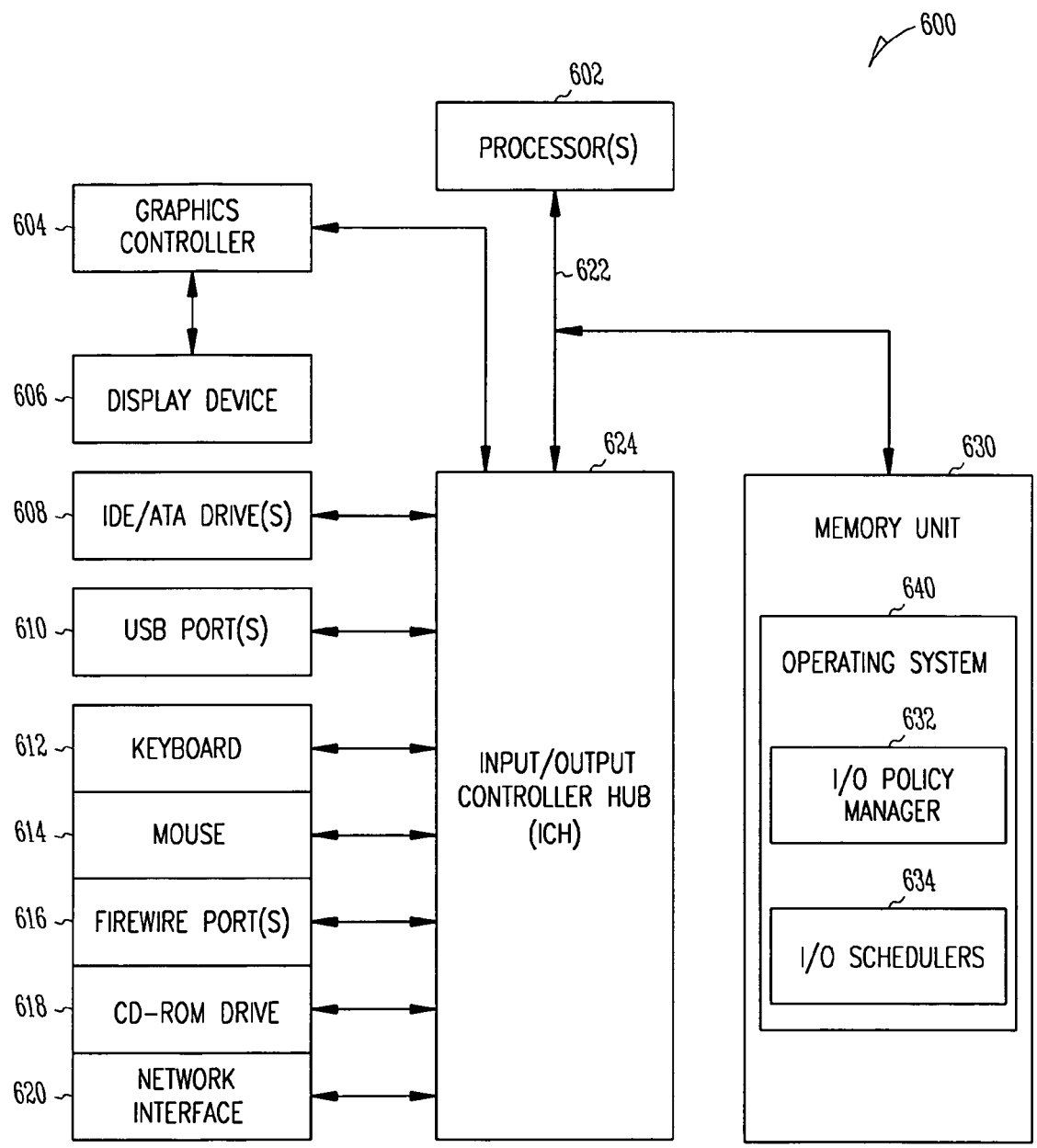
FIG. 6 illustrates an example embodiment of a computer system that may be used in conjunction with one or more embodiments of the present invention.

FIG. 6 illustrates an example computer system used in conjunction with certain example embodiments of the invention. As illustrated in FIG. 6, computer system 600 comprises processor(s) 602. The computer system 600 also includes a memory unit 630, processor bus 622, and Input/Output controller hub (ICH) 624. The processor(s) 602, memory unit 630, and ICH 624 are coupled to the processor bus 622. The processor(s) 602 may comprise any suitable processor architecture. The computer system 600 may comprise one, two, three, or more processors, any of which may execute a set of instructions in accordance with embodiments of the present invention.

The memory unit 630 includes an operating system 640, which includes an I/O scheduling policy manager 632 and I/O schedulers 634. The memory unit 630 stores data and/or instructions, and may comprise any suitable memory, such as a dynamic random access memory (DRAM), for example. The computer system 600 also includes IDE drive(s) 608 and/or other suitable storage devices. A graphics controller 604 controls the display of information on a display device 606, according to embodiments of the invention.

The Input/Output controller hub (ICH) 624 provides an interface to I/O devices or peripheral components for the computer system 600. The ICH 624 may comprise any suitable interface controller to provide for any suitable communication link to the processor(s) 602, memory unit 630 and/or to any suitable device or component in communication with the ICH 624. For one embodiment of the invention, the ICH 624 provides suitable arbitration and buffering for each interface.

For one embodiment of the invention, the ICH 624 provides an interface to one or more suitable integrated drive electronics (IDE) drives 608, such as a hard disk drive (HDD) or compact disc read-only memory (CD ROM) drive, or to suitable universal serial bus (USB) devices through one or more USB ports 610. For one embodiment, the ICH 624 also provides an interface to a keyboard 612, a mouse 614, a CD-ROM drive 618, and one or more suitable devices through one or more firewire ports 616. The ICH 624 also provides a network interface 620 though which the computer system 600 can communicate with other computers and/or devices.

In one embodiment, the computer system 600 includes a machine-readable medium that stores a set of instructions (e.g., software) embodying any one, or all, of the methodologies for dynamically loading object modules described herein. Furthermore, software can reside, completely or at least partially, within memory unit 630 and/or within the processor(s) 602.

Thus, a system, method, and machine-readable medium including instructions for Input/Output scheduling have been described. Although the present invention has been described with reference to specific example embodiments, it will be evident that various modifications and changes may be made to these embodiments without departing from the broader spirit and scope of the disclosed subject matter. Accordingly, the specification and drawings are to be regarded in an illustrative rather than a restrictive sense.

In the foregoing detailed description of embodiments of the invention, various features are grouped together in one or more embodiments for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the detailed description of embodiments of the invention, with each claim standing on its own as a separate embodiment. It is understood that the above description is intended to be illustrative, and not restrictive. It is intended to cover all alternatives, modifications and equivalents as may be included within the scope of the invention as defined in the appended claims. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

The abstract is provided to comply with 37 C.F.R. 1.72(b) to allow a reader to quickly ascertain the nature and gist of the technical disclosure. The Abstract is submitted with the understanding that it will not be used to interpret or limit the scope or meaning of the claims.

The invention claimed is:

1. A computerized process comprising:
capturing a first image in an image acquisition system, the image acquisition system including a processor;
capturing successive images in the image acquisition system;
preprocessing in the processor the first and successive images acquired by the image acquisition system to locate seed points, the preprocessing comprising subtracting said successive images from said first image;
using said processor to subject output of said preprocessing to feature extraction; and
using said processor to model a life cycle of corrosion resulting from said seed points;
wherein said seed points are identified by identifying an expected direction of change in said seed points.

2. The process of claim 1, wherein said modeling comprises an analysis of the rate of change of said features of said corrosion.

3. The process of claim 1, wherein said preprocessing comprises:
providing a reference image;
providing an actual image;
extracting potential patches and points from said actual image;
calculating a correlation in the rate of change of said potential patches and points;
identifying said patches and points as noise when there is no correlation; and
identifying said patches and points as seed points when there is a correlation.

4. The process of claim 3, further comprising applying a threshold to said actual image in order to remove said noise.

5. The process of claim 1, wherein said seed points are identified by correlating a rate of change of features of said successive images.

6. The process of claim 1, wherein said preprocessing of said input corrosion images comprises:
analyzing the pit shape of said corrosion;
analyzing the pit size of said corrosion;
analyzing the pit roughness of said corrosion; and
analyzing the pit crack length of said corrosion.

7. The process of claim 6, wherein
said pit shape is analyzed using deformable contours;
said pit size is analyzed by measuring the diameter of the pit mouth; and
said roughness is measured as a mean height of the features of said corrosion.

8. The process of claim 1, further comprising:
weighting pits depending upon the phase that said pit is in; and
determining the density of pits in a region;
wherein said corrosion life cycle is modeled as a nucleation phase, a corrosion growth phase, and a crack propagation phase.

9. The process of claim 1, further comprising:
quantifying fatigue by identifying a dominant phase of a plurality of pits; and
calculating a corrosion impact factor.

10. The process of claim 9, wherein said corrosion impact factor is calculated as follows:

$$CIF = \sum_{i=1}^{N1}(W_i * DPC_i) + \sum_{g=1}^{N2}(W_g * DPC_g) + \sum_{c=1}^{N3}(W_c * DPC_c)$$

wherein
The notation "i" indicates the nucleation phase;
The notation "g" indicates the corrosion growth phase;
The notation "c" indicates the crack propagation phase;
The notation N1 represents the number of pits dominantly in the nucleation phase;
The notation N2 represents the number of pits dominantly in the growth phase;
The notation N3 represents the number of pits dominantly in the crack phase;
The notation $W_i$ is a weight derived from nucleation features and the dynamics and density of the pits;
The notation $W_g$ is a weight derived from growth features and the dynamics and density of the pits;
The notation $W_c$ is a weight derived from crack features and the dynamics and density of the pits;
The notation $DPC_i$ is the phase contribution of a pit whose dominant phase is the nucleation phase;
The notation $DPC_g$ is the phase contribution of a pit whose dominant phase is the corrosion growth phase; and
The notation $DPC_c$ is the phase contribution of a pit whose dominant phase is the crack propagation phase.

11. The process of claim 1, wherein a three dimensional (3D) rendered corrosion image is generated from said input corrosion images.

12. A computer-readable medium embodying a program comprising instructions thereon for executing a process comprising:
capturing a first image in an image acquisition system, the image acquisition system including a processor;
capturing successive images in the image acquisition system;
preprocessing the first and successive images to locate seed points, the preprocessing comprising subtracting said successive images from said first image;
subjecting output of said preprocessing to feature extraction; and
modeling a life cycle of corrosion resulting from said seed points;
wherein said seed points are identified by identifying an expected direction of change in said seed points.

13. The computer-readable medium of claim 12, wherein said modeling comprises an analysis of the rate of change of said features of said corrosion; and further wherein said preprocessing comprises:
providing a reference image;
providing an actual image;
extracting potential patches and points from said actual image;
calculating a correlation in the rate of change of said potential patches and points;
identifying said patches and points as noise when there is no correlation; and
identifying said patches and points as seed points when there is a correlation.

14. The computer-readable medium of claim 12, further comprising instructions for:
quantifying fatigue by identifying a dominant phase of a plurality of pits; and
calculating a corrosion impact factor;

wherein said corrosion impact factor is calculated as follows:

$$CIF = \sum_{i=1}^{N1}(W_i * DPC_i) + \sum_{g=1}^{N2}(W_g * DPC_g) + \sum_{c=1}^{N3}(W_c * DPC_c)$$

wherein
The notation "i" indicates the nucleation phase;
The notation "g" indicates the corrosion growth phase;
The notation "c" indicates the crack propagation phase;
The notation N1 represents the number of pits dominantly in the nucleation phase;
The notation N2 represents the number of pits dominantly in the growth phase;
The notation N3 represents the number of pits dominantly in the crack phase;
The notation $W_i$ is a weight derived from nucleation features and the dynamics and density of the pits;
The notation $W_g$ is a weight derived from growth features and the dynamics and density of the pits;
The notation $W_c$ is a weight derived from crack features and the dynamics and density of the pits;
The notation $DPC_i$ is the phase contribution of a pit whose dominant phase is the nucleation phase;
The notation $DPC_g$ is the phase contribution of a pit whose dominant phase is the corrosion growth phase; and
The notation $DPC_c$ is the phase contribution of a pit whose dominant phase is the crack propagation phase.

15. A computerized method to predict corrosion comprising:
using a processor for:
capturing a plurality of images;
comparing said captured images with a reference image;
subtracting said captured images from said reference image;
correlating between captured images to differentiate between corroded and non-corroded images;
constructing sub-regions of said captured images;
identifying regions of interest in said sub-regions to characterize corrosion seed points based on rates of change of features of said corrosion;
identifying a dominant phase of corrosion at said seed points based on said rate of change of features;
identifying the effect of said features on each of said seed points on proximate seed points and state of corrosion of said sub-region; and
calculating an impact factor to predict the state of corrosion of said sub-regions.

16. The method of claim 15, wherein said subtraction is weighted.

17. The method of claim 15, wherein said correlating comprises higher-order statistical calculations.

18. The method of claim 15, wherein said sub-regions comprise a density of pits and a dominant phase of pits.

19. The method of claim 15, wherein said features comprise pit shape, pit size, pit roughness, crack length; and density of pits.

* * * * *